(12) United States Patent
Woxblom

(10) Patent No.: US 8,924,305 B2
(45) Date of Patent: Dec. 30, 2014

(54) DLNA DATA DISTRIBUTION FROM A REMOTE SOURCE

(75) Inventor: Mikael Woxblom, Älvsjö (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 404 days.

(21) Appl. No.: 13/202,288

(22) PCT Filed: Feb. 20, 2009

(86) PCT No.: PCT/SE2009/050190
§ 371 (c)(1),
(2), (4) Date: Aug. 18, 2011

(87) PCT Pub. No.: WO2010/095990
PCT Pub. Date: Aug. 26, 2010

(65) Prior Publication Data
US 2011/0307376 A1    Dec. 15, 2011

(51) Int. Cl.
*G06F 21/00* (2013.01)
*G06Q 20/10* (2012.01)
*H04L 12/28* (2006.01)

(52) U.S. Cl.
CPC ............ *G06Q 20/10* (2013.01); *H04L 12/2812* (2013.01); *H04L 12/2818* (2013.01); *H04L 2012/2849* (2013.01)
USPC .................................. 705/51; 705/53; 726/28

(58) Field of Classification Search
USPC .................... 705/51, 53; 726/27–30
See application file for complete search history.

(56) References Cited

U.S. PATENT DOCUMENTS

| 5,848,134 | A | * | 12/1998 | Sekiguchi et al. | 379/93.15 |
|---|---|---|---|---|---|
| 6,345,307 | B1 | * | 2/2002 | Booth | 709/247 |
| 6,928,087 | B2 | * | 8/2005 | Slowe et al. | 370/477 |
| 7,437,458 | B1 | | 10/2008 | Stewart et al. | |
| 8,209,260 | B2 | * | 6/2012 | Kim et al. | 705/51 |
| 8,356,323 | B2 | * | 1/2013 | Chiang | 725/80 |
| 2004/0009815 | A1 | | 1/2004 | Zotto et al. | |
| 2004/0064704 | A1 | * | 4/2004 | Rahman | 713/182 |
| 2004/0117279 | A1 | * | 6/2004 | Dutta et al. | 705/34 |
| 2004/0139211 | A1 | | 7/2004 | Baker et al. | |

(Continued)

FOREIGN PATENT DOCUMENTS

| EP | 1376301 A2 | 1/2004 |
|---|---|---|
| EP | 1850235 A1 | 10/2007 |

(Continued)

OTHER PUBLICATIONS

Ron White, "How Computers Work", Que, Oct. 15, 2003.*

*Primary Examiner* — Steven Kim
(74) *Attorney, Agent, or Firm* — Coats & Bennett, PLLC

(57) ABSTRACT

Information distribution relates to a DLNA device (30) involves receiving, at a request server (100) in a global network (20), a media request for a media content having a specific media format from the DLNA device (30) present in a home network (10). The request server (100) processes the media request based on user and media identifiers provided therein and provides a response. This response enables rendering by a DLNA compatible digital media player (200, 400) of response information relating to the media request and being of the specific media format. A user of the DLNA device (30) can therefore be informed of the processing of his media request.

11 Claims, 10 Drawing Sheets

(56) References Cited

U.S. PATENT DOCUMENTS

| | | | |
|---|---|---|---|
| 2005/0138137 A1* | 6/2005 | Encarnacion et al. | 709/217 |
| 2005/0254524 A1* | 11/2005 | An | 370/487 |
| 2005/0283813 A1* | 12/2005 | Jamail et al. | 725/109 |
| 2006/0259852 A1* | 11/2006 | Upendran et al. | 715/500.1 |
| 2007/0237115 A1 | 10/2007 | Bae et al. | |
| 2008/0244373 A1* | 10/2008 | Morris et al. | 715/202 |
| 2009/0193469 A1 | 7/2009 | Igarashi | |
| 2009/0245758 A1* | 10/2009 | Kodama et al. | 386/124 |

FOREIGN PATENT DOCUMENTS

| | | |
|---|---|---|
| JP | 2004056793 A | 2/2004 |
| JP | 2005115533 A | 4/2005 |
| JP | 2006260329 A | 9/2006 |
| WO | 2007105568 A1 | 9/2007 |

\* cited by examiner

DLNA DATA DISTRIBUTION FROM A REMOTE SOURCE

TECHNICAL FIELD

The present invention generally relates to data distribution to user equipment present in a home network, and in particular to such data distribution to digital living network alliance compatible user equipment.

BACKGROUND

Digital Living Network Alliance (DLNA) is an international, cross-industry collaboration and standard that has been developed in order to facilitate consumer devices to communicate with each other in a home network and share media between the devices.

The DLNA compatible devices communicate with each other within the home network via Universal Plug and Play (UPnP), which is a set of protocols that allow devices to connect seamlessly and share data.

DNLA compatible user equipment is operable within a home network typically comprising multiple DLNA compatible user equipment, potentially of different types and manufactures. In the art, a division of DLNA compatible user equipment based primarily on their function in the media distribution and rendering within the home network has been used and involves, among other, Digital Media Server (DMS), Mobile DMS (M-DMS), Digital Media Player (DMP), Mobile DMP (M-DMP), Digital Media Renderer (DMR), Digital Media Controller (DMC) and Mobile DMC (M-DMC).

DMS and M-DMS are devices that store media content and make it available to wired and/or wireless networked DMP, M-DMP and DMR. DMS and M-DMS include, among others, personal computers, network attached storage (NAS) devices, mobile phones and portable music players. A DMP or M-DMP is a device that finds content on a DMS or M-DMS and provides playback and rendering capabilities. TVs, stereos, home theatres, wireless monitors, game consoles, mobile phones and mobile media tables are illustrative examples of user equipment that can operate as DMP or M-DMP. A DMC or M-DMC is a device that finds content on a DMS or M-DMS and plays it on a DMR. DMC and M-DMC include Internet tablets, Wi-Fi® enabled digital cameras, personal digital assistants (PDA) and mobile phones, etc. Finally, a DMR is a device that plays content received from a DMC or M-DMC and includes devices, such as TVs, audio/video receivers, video displays, remote speakers.

A DLNA based home network may also include other DLNA compatible devices such as Digital Media Printer (DMPr), Mobile Digital Media Uploader (M-DMU), Mobile Digital Media Donwloader (M-DMD) Mobile Network Connectivity Function (M-NCF) and Media Interoperability Unit (MIU).

SUMMARY

It has been proposed to introduce virtual DMS (vDMS) devices in the home network. A vDMS device acts as a normal DMS towards the DMP and DMR devices but has the possibility to get the presented media from remote places, such as over the internet or some other global network.

vDMS opens up for new media distribution methods for the DLNA compatible devices but also brings about new challenges. Today, a user of the DLNA device cannot efficiently be informed about the handling of a media request sent to a remote media server, such as whether the media request can be effected or not depending on the account status of the user.

Embodiments overcome these and other drawbacks of the prior art arrangements.

It is a general objective to provide an efficient information distribution to DLNA compatible user equipment and devices in a home network relating to media requests.

This and other objectives are met by embodiments as defined by the accompanying patent claims.

Briefly, the present invention relates to information distribution involving DLNA compatible user equipment present in a home network. The user equipment compiles and transmits a media request for a media content having a specific media type to a request server present in a global network connected to the home network. The request server processes the media request based on media and user identifiers included therein. In response to the request processing, the request server provides a response that is transmitted to the user equipment. This response enables rendering by a DLNA compatible digital media player in the home network of response information relating to the media request and, in addition, being of the same specific media type as the requested media content.

Thus, the response information of the specific media type is used to inform the user of the media request processing and can, for instance, be used to inform the user of a denied access to the requested content, e.g. due to too low account status of the user.

Embodiments therefore allow DLNA compatible user equipment to get feedback from a back-end system on the outcome of its actions. This is a novel feature for DLNA compatible user equipment, for which hitherto no efficient information distribution method exists allowing a back-end system, such as request server, to provide information relating to media requests and other actions of the user equipment.

BRIEF DESCRIPTION OF THE DRAWINGS

Embodiments together with further objects and advantages thereof, may best be understood by making reference to the following description taken together with the accompanying drawings, in which.

DETAILED DESCRIPTION

Figure 1:
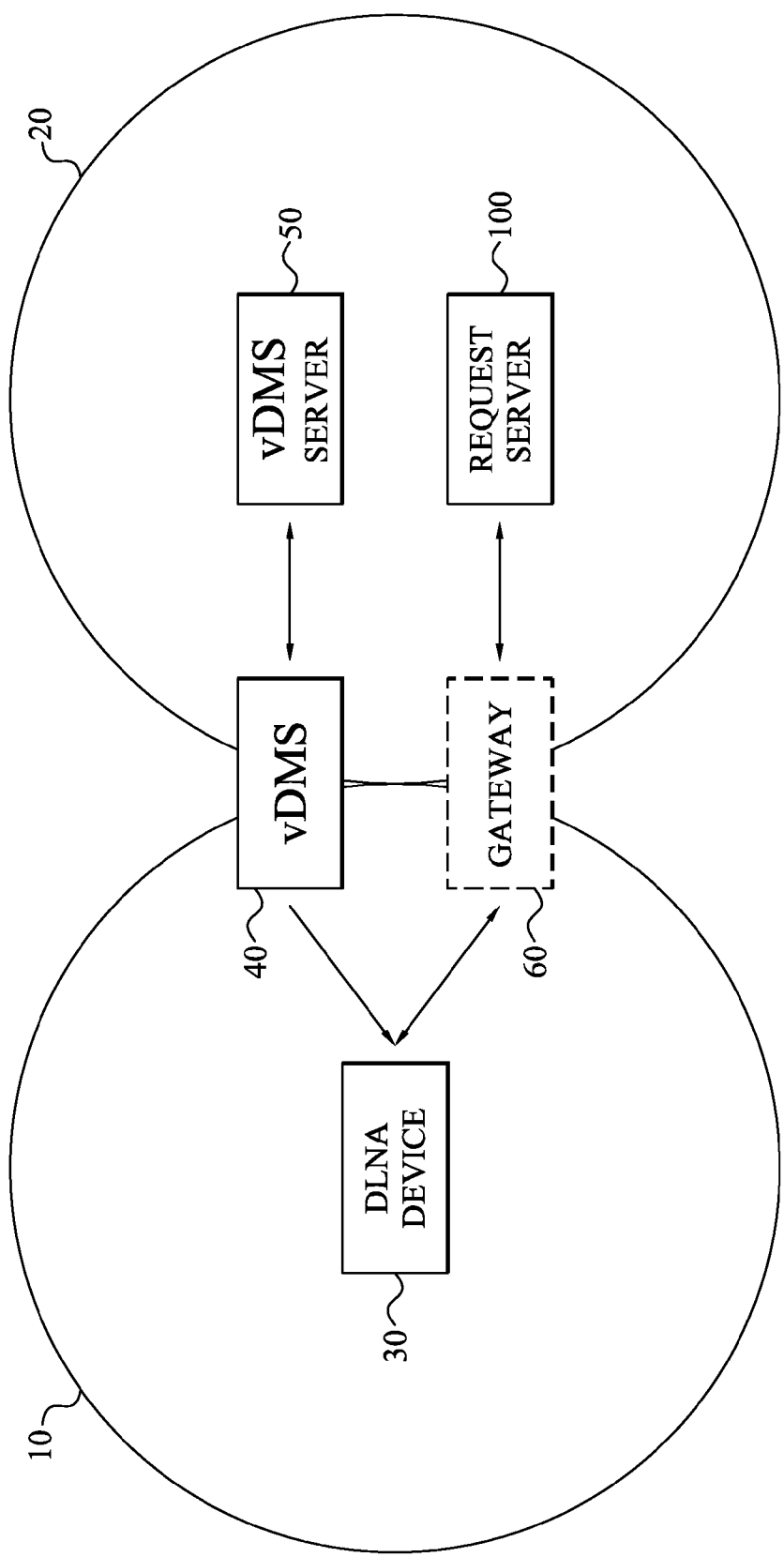
FIG. 1 is a schematic overview a home network and a global network with including units according an embodiment.

Throughout the drawings, the same reference characters will be used for corresponding or similar elements.

The present invention generally relates to information distribution involving Digital Living Network Alliance (DLNA) compatible user equipment.

DLNA is a standard and collaboration directed towards allowing consumer electronics, including personal computers and mobile devices, to communicate with each other and share digital media and content therebetween. The communication protocol that is used to communicate between DLNA compatible user equipment is Universal Plug and Play (UPnP) managed by the UPnP Forum.

DLNA compatible user equipment, such as mobile telephone and other terminals mentioned in the background section, may indeed have several roles in a home network, depending on the hardware and/software resources of the user equipment. For instance, a single device or user equipment may include functionality for enabling both the role of a DMS and a DMP.

In the following, DLNA compatible user equipment is used to denoted a device capable of operating in a DLNA based home network and communicate with other DLNA compatible devices using the UPnP protocol. Such user equipment could therefore possess the role of at least one of DMP, M-DMP, DMC, M-DMC and possible also at least one of DMS, M-DMS and/or DMR.

The traditional approach in DLNA based home networks has been to have one or more DMS/M-DMS devices storing media content on its hardware. This media content is presented to a user by a DMP/M-DMP device or DMC device. The media content presentation is typically in the form of tree structure that lists the available media content, such as:

```
Root
|_ Movies
|    |_ Drama
|    |_ Action
|         |_ Movie X
|         |_ Movie Y
|_ Music
|_ Pictures
```

A selected media content, such as video, audio or image, is then made available to a DMP/M-MDP device or a DMR device, where it is rendered or played back to the user.

It has, though, been discussed to allow handling of media content from a remote source in a DLNA based home network. In such a case, a so-called virtual DMS (vDMS) is used. This vDMS device acts as a normal DMS device towards DMP/M-DMP devices and DMC devices but has the possibility of getting the media content from other places than just its local hard drive, such over Internet or another global network.

With the emergence of allowing distribution of media content into a DLNA based home network from remote sources new challenges arise. One such challenge is to allow distribution of information relating to media requests from a remote resource to the user of a DLNA device. Embodiments as disclosed herein provide an efficient such information distribution that is suitable for implementation together with DLNA compatible devices and user equipment.

FIG. 1 is a schematic overview of an example of a communication system comprising a DLNA based home network 10 and a global network 20. This global network 20 can, for instance, be represented by the Internet or a managed or proprietary network, such as a radio based communication network for mobile user equipment.

The home network 10 comprises, in this example, a vDMS device 40 capable of communicating with a vDMS server 50 provided in the global network 20. In a typical embodiment, the vDMS device 40 first registers to the vDMS server 50. This registration can indeed be a user-specific registration, in which the vDMS device 40 forwards a user identifier assigned to a user in the home network 10 during the registration procedure. The vDMS then preferably has access to the user identifier, such as stored in an extensible markup language (XML) file. The registration procedure can use, for instance, Session Initiation Protocol (SIP) or Hypertext Transfer Protocol (HTTP) signaling between the vDMS device and the vDMS server 50.

The vDMS server 50 returns, following the registration, a media list identifying the media content available to the user. This media list is basically in a same format, e.g. tree structure, as the media list listing media content available at the hard drive of traditional DMS/M-DMS devices.

If the registration involved the transfer of a user identifier, the vDMS server 50 can provide and forward a media list adapted to the particular user. For instance, user preferences that have previously been registered at the vDMS server 50 for the particular user can be utilized in order to provide media content offers that are deemed to be of more interest for the user based on the user preferences. Furthermore, past ordered media content can be associated to the user identifier in the vDMS server 50 to thereby suggest media content based on prior media orderings/rendering by the same user. It is actually possible that the media list could contain media content that other users and friends have suggested to the vDMS server 50 to be of interest of the particular user.

In either case, the received media list is presented to the DLNA device 30 and user by the vDMS device 40. The user can now select a particular media content from the media list in the same way as if the content was actually locally available at the vDMS device 40. The vDMS device 40 may optionally be implemented to periodically request an updated media list from the vDMS server 50 so that the vDMS device 40 has access to "fresh" and relevant information of available media content for the user.

Figure 2:
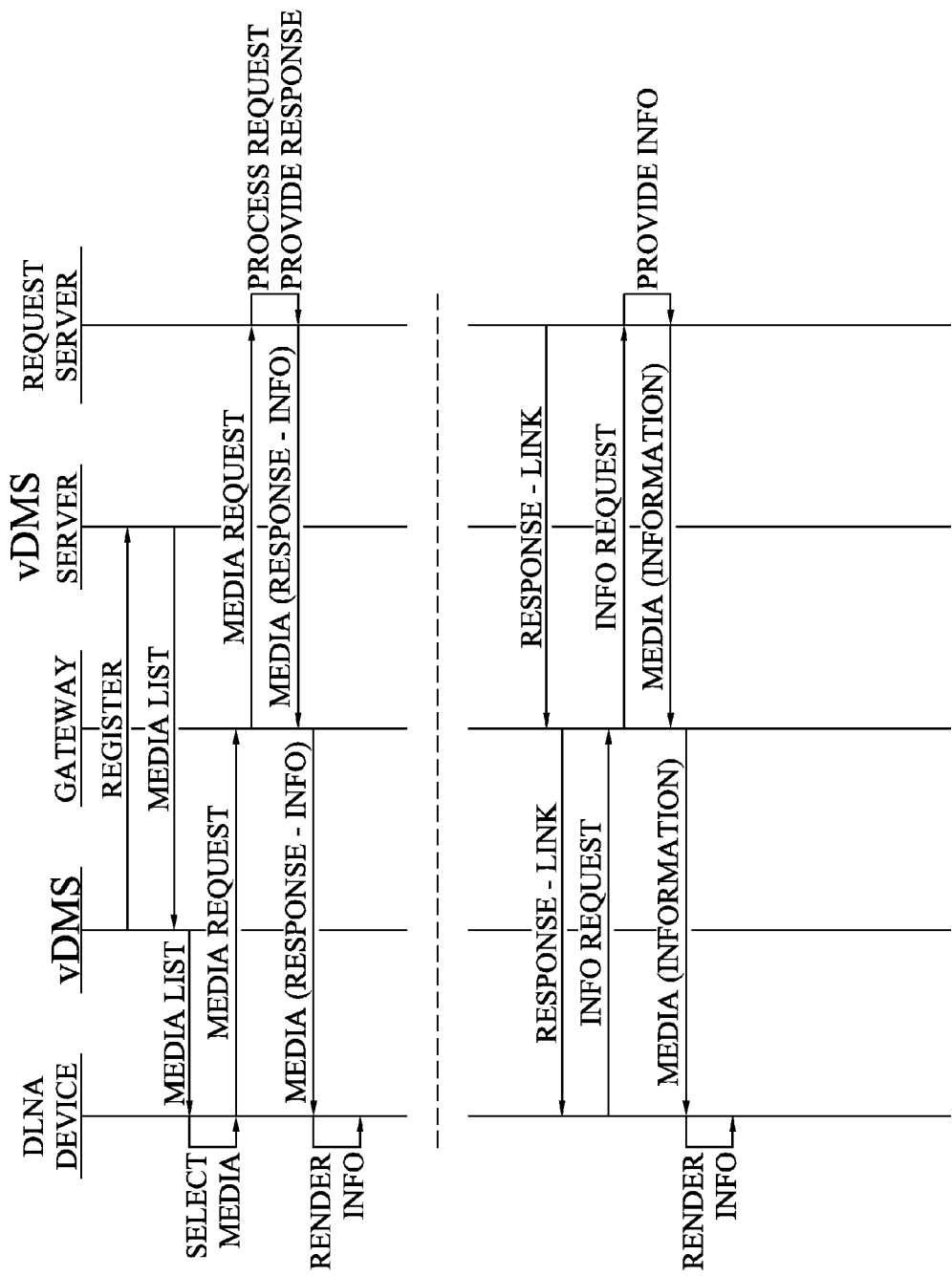
FIG. 2 is a signal diagram of an information distributing method according to an embodiment.

FIG. 2 is a flow diagram illustrating an information distributing method according to an embodiment. This distributing method can advantageously be implemented in the communication system of FIG. 1.

As is illustrated in FIG. 2, the vDMS device 40 typically registers at the vDMS server 50, which then returns a media list that is presented to the user on a DLNA device 30 communicating with the vDMS device 40 using the UPnP protocol. Note though that the vDMS device 40 and the DLNA device 30 could be different or same physical user equipment.

The user selects one of the presented media contents with the DLNA-device 30, which compiles, based on the content selection, a media request for a media content or asset having a specific media type and format. Thus, the requested media content could be an image type, such in any of the following image formats: Joint Photographic Experts Group (JPEG); Graphics Interchange Format (GIF); Tagged Image File Format (TIFF) or Portable Network Graphics (NPG). Alternatively, the media content is of audio type, which could, for example, be in any of the following audio formats: Linear Pulse Code Modulation (LPCM); Moving Picture Experts Group-1 (MPEG-1) Audio Layer 3 (MP3); Windows Media Audio (WMA), such as WMA9; AC-3; Advanced Audio Coding (AAC), such as AAC Low Complexity (AAC LC), High Efficiency AAC (HE AAC), AAC Long Term Predictor (AAC LTP); Adaptive Transform Acoustic Coding (ATRAC), such as ATRAC3plus; MPEG4; Bit Sliced Arithmetic Coding (BSAC); Adaptive Multi-Rate (AMR) and G.726. A further example of media type is video, such as any of the formats: MPEG2; MPEG1; MPEG5; Windows Media Video (WMV), such as WMV9; MPEG4 Advanced Video Coding (AVC); VC-1; H.263 and MPEG part 2.

The media request comprises a media identifier of the media content and a user identifier of the user. The media request can advantageously, but is not necessarily, a HTTP request comprising the media identifier and the user identifier. A non-limiting example of such a HTTP request could be:

> http://www.RequestServer.com/userID/movieX.mpg
> or
> http://RequestServer.com?movie=movieX&user=userID where userID represents the user identifier and movieX indicates the media identifier.

The media request is transmitted from the DLNA device 30 in the home network to a remote request server 100 present in the global network connected to the home network 10. An optional gateway 60 may be implemented in the interface between the home network 10 and the global network 20. In such a case, the gateway 60 receives the media request from the DLNA device 30 and forwards it to the request server 100.

The request server 100 processes the media request based on the media identifier and the user identifier. This processing of the request server 100 involves determining the media type and preferably also the actual media format of the requested media content. This media type or media format detection is furthermore conducted based on the media identifier included in the media request. For example, with the HTTP request above, the request server 100 detects that the media type of the requested media content is video and the video format is MPEG as is evident from the suffix .mpg or can be determined using the media identifier.

A response is provided by the request server 100 based on the processing of the media request. This response enables rendering by a digital media player 30, such as DMP/M-DMP device or DMR device, present in the home network 10 of response information relating to the media request. Furthermore, this response information is of the same specific media type and preferably the same media format as the requested media content identified by the media identifier. Thus, if the requested media content was a movie, i.e. video type, the response information is also of a video type. In addition, the particular video format of the response information is preferably identical to the video format of the requested movie, such as one of the previously mentioned video formats. Correspondingly, if the requested media is audio or an image, the response information will be in an audio or image format, respectively.

Rendering response information in the video format will therefore present a video sequence at a screen of the digital media player. Correspondingly, response information in an image format will display an image containing the relevant information on the screen. Response information in an audio format is, however, played back on a loudspeaker of the digital media player to thereby audibly present the information to the user.

The request server 100 therefore preferably selects the appropriate response information type and preferably format based on the detected media type or format as determined from the media identifier in the media request.

The reason for this limitation in response information formats is that a DLNA device 30 is today limited to receive and render media of a same media type and format as that of a previously requested media content. Thus, if, for instance, a movieX.mpg was requested, the DLNA device 30 expects to receive media content data of MPEG format and can therefore only handle data in such format during the current media session. The inventor has therefore utilized this limitation in order to be able to provide response information to the user relating to the media request.

This response information could be regarded as meta data or descriptive data that is of interest to the user and relates to the media request. A typical, but non-limiting example of such response information, could be response information informing the user whether he/she can access the requested media or not.

The response provided by the request server 100 enables rendering of the response information in the digital media player 30. This digital media player 30 could be the same DLNA compatible device 30 that generated and transmitted a media request, especially for a DMP/M-DMP device. However, if, for instance, the request generating device 30 is a DMC/M-DMC device, the digital media player could be a DMR device that could be housed in the same or different physical user equipment as the DMC/M-DMC device.

In an embodiment, the request server 100 directly provides and transmits the response information, typically in the form of one or more data packets carrying the response information. The data transmission may optionally utilize the gateway 60 for forwarding the data to the digital media player 30.

However, in an alternative embodiment, illustrated in the lower portion of FIG. 2, the request server 100 compiles a redirect response comprising a link or other data that can be processed by the DLNA device 30 in order to identify the location from which the response information can be fetched. If the media request was a HTTP based request, the redirect response could a HTTP redirect response, such as:
HTTP/1.1 302 Found
Location: http://www.RequestServer.com/ResponseInformation.mpg The HTTP response status code 302 Found is a very suitable way of performing a redirection. However, other response status codes besides 302 Found, including other HTTP response status codes, could alternatively be used to allow a redirection.

Upon reception of the redirect response, the DLNA device 30 simply processes the redirect response and compiles and transmits an information request to the intended receiver indicated in the response from the request server 100. The receiver of the information request could indeed be the same request server 100 as received the original media request or another server arranged in the global network 20, which is described further herein.

The server receiving the information request compiles and returns the response information indicated in the information request. One or more data packets comprising the response information relating the media request and being of the specific media type is generated and returned to the DLNA device 30 for rendering by a digital media player in the home network 10.

Figure 3:
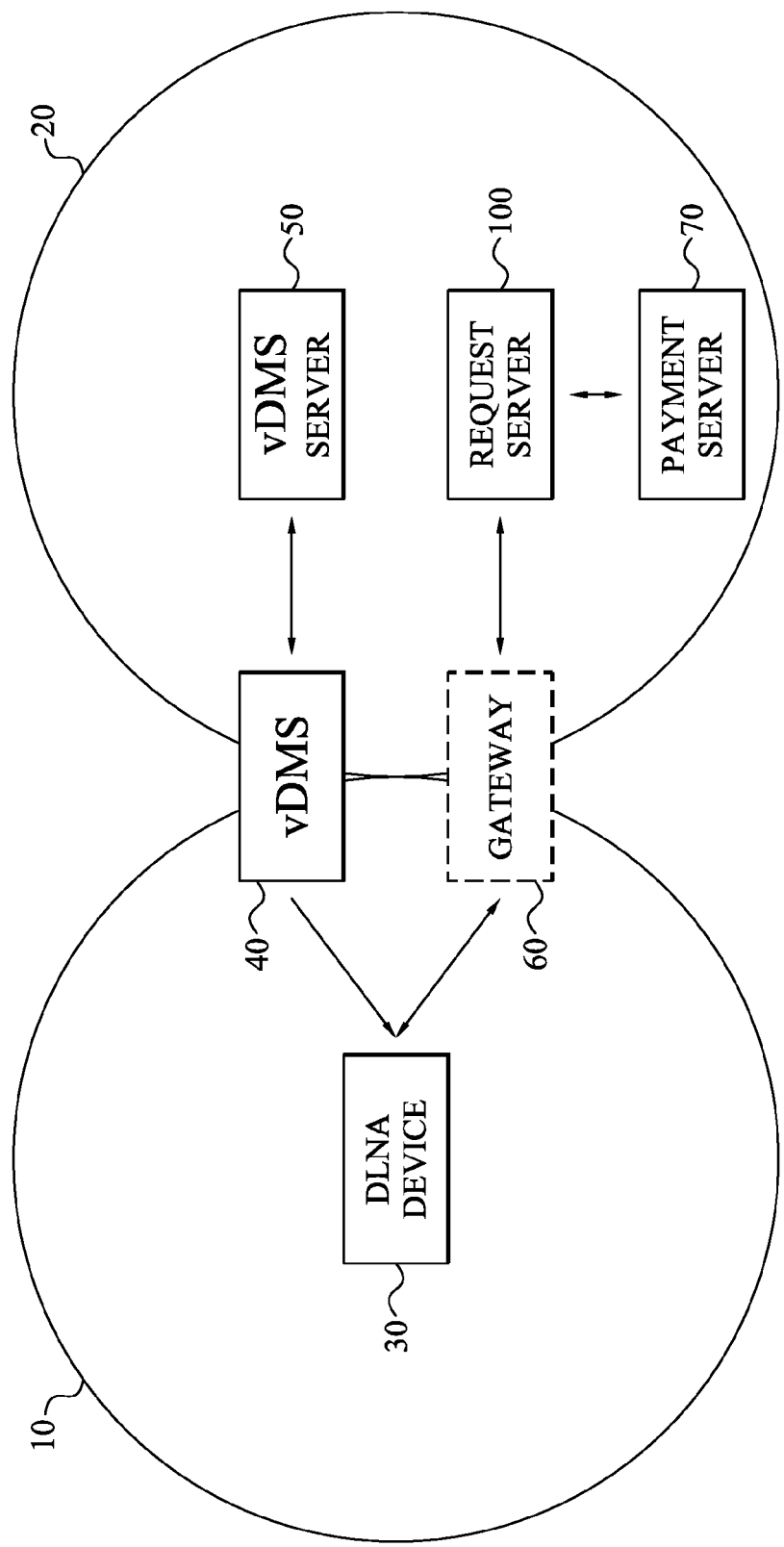
FIG. 3 is a schematic overview a home network and a global network with including units according another embodiment.
Figure 4:
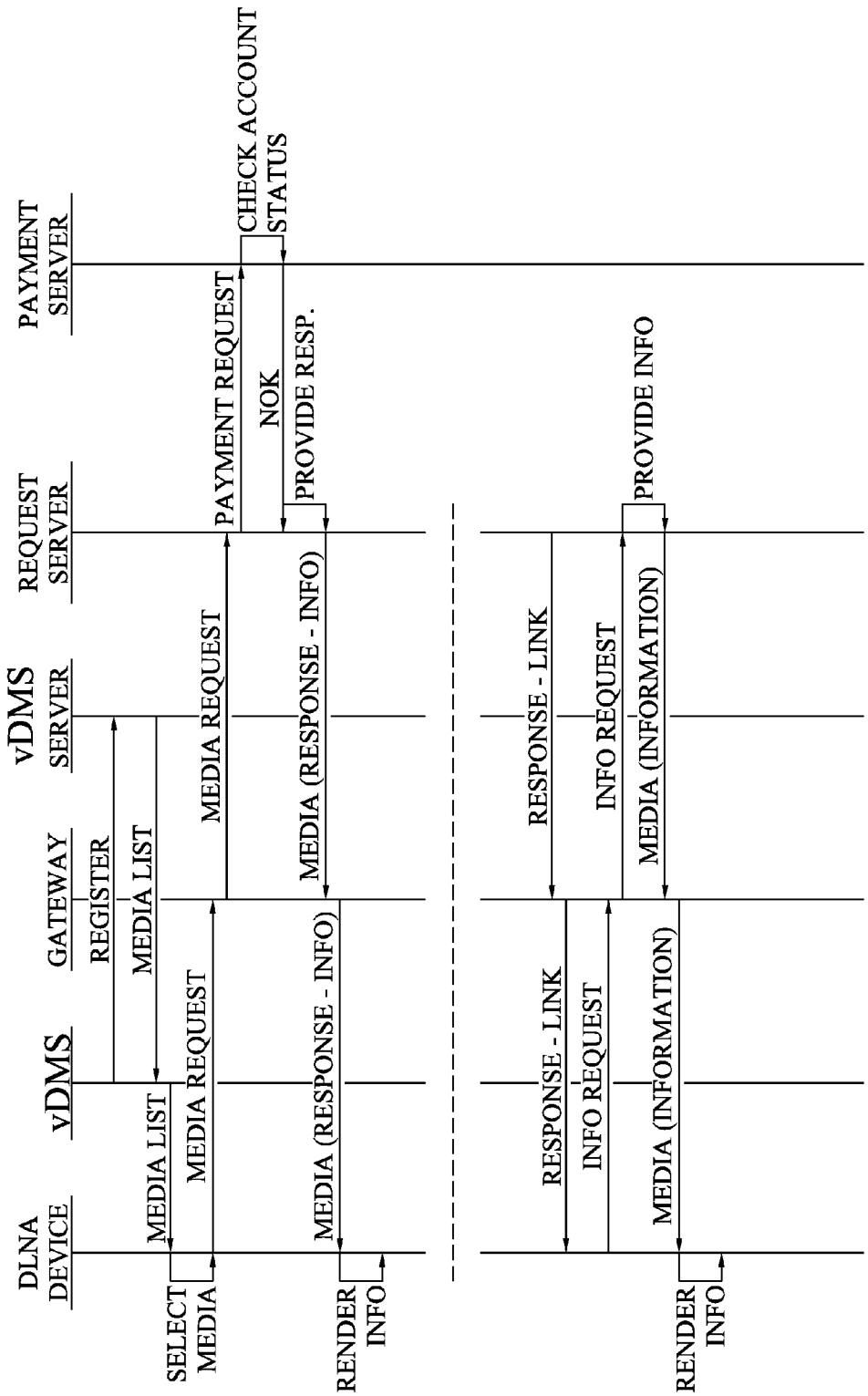
FIG. 4 is a signal diagram of an information distributing method according to another embodiment.

FIG. 3 illustrates another example of a communication system comprising a DLNA based home network 10 and connected global network 20. FIG. 4 schematically illustrated embodiments of information distribution in the communication system of FIG. 3.

In this embodiment, once the request server 100 receives the media request comprising the media identifier and user identifier, it generates a payment request based on the identifiers. The payment request is forwarded to a payment server 70 present in the global network 20. This payment server 70 may indeed be positioned in a same physical network node as the request server 100 or could be arranged remotely therefrom, i.e. in another network node.

The payment server 70 analyzes the received payment request for the purpose of determining whether the user should be allowed access to the media or not. This decision could, for instance, be based on a current account status of the user at the payment server 70 or a payment broker accessible to the payment server 70. Alternatively, the payment server 70 could have list of users who have unsettled debts for previously ordered media content and are therefore not allowed to buy any new media content until the previous debts have been settled.

Payment of media content can be affected according to various techniques known in the art. For instance, the user can have an account at the payment server 70 that is charged each time media content is ordered, bought or rented. Alternatively, the payment server 70 has access to credit card information of the user and can therefore charge the credit card upon reception of the payment request. Such credit card information could otherwise be included in the media request together with the media identifier. A further possibility is to generate and send an invoice to the user once media content has been ordered.

The payment server 70 generates and returns a payment response to the request server 100. If access to the requested media is not allowed to the user, for example due to too low account status, credit card is not accepted or previously issued invoices are not settled, the payment response indicates disallowed access as illustrated in FIG. 4. The payment response may simply indicate that the user is not allowed access to the media. Alternatively, further descriptive information disclosing why the media access is denied could also be included in the payment response, such as too low account status, not valid credit card, etc.

In the prior art, there has been no efficient technique of notifying the user of a DLNA device 30 that a requested media content could not be provided. Embodiments as disclosed herein, however, solves this problem through the generation and provision of the response information that is of the same media type and preferably format as the requested media content.

Thus, the request server 100 generates the response that enables rendering of the response information based on the payment response from the payment server. In the upper portion of FIG. 4, the request server 100 directly returns data packets comprising the response information in the specific media format. In the lower part of the figure, the request server 100 returns a redirect response with a link allowing the DLNA device 30 to fetch the response information in the specific media format from a server 100 implemented in the global network 20 as previously described.

In this latter case, the server 100 has access to multiple predefined responses that could be used in connection with a media session. The request server 100 therefore uses the payment response from the payment server 70 to identify the most appropriate predefined response for the present case. The link of that predefined response is then returned to the DLNA device 30.

Whichever embodiment, the response information in the correct media format is rendered at the digital media player of the user to thereby visually, in the form of an image or video sequence, or audibly, in the form of an audio sequence, present to the user that access to the requested media is denied. The response information when being rendered may additionally also inform the user of why media access was not granted.

Figure 5:
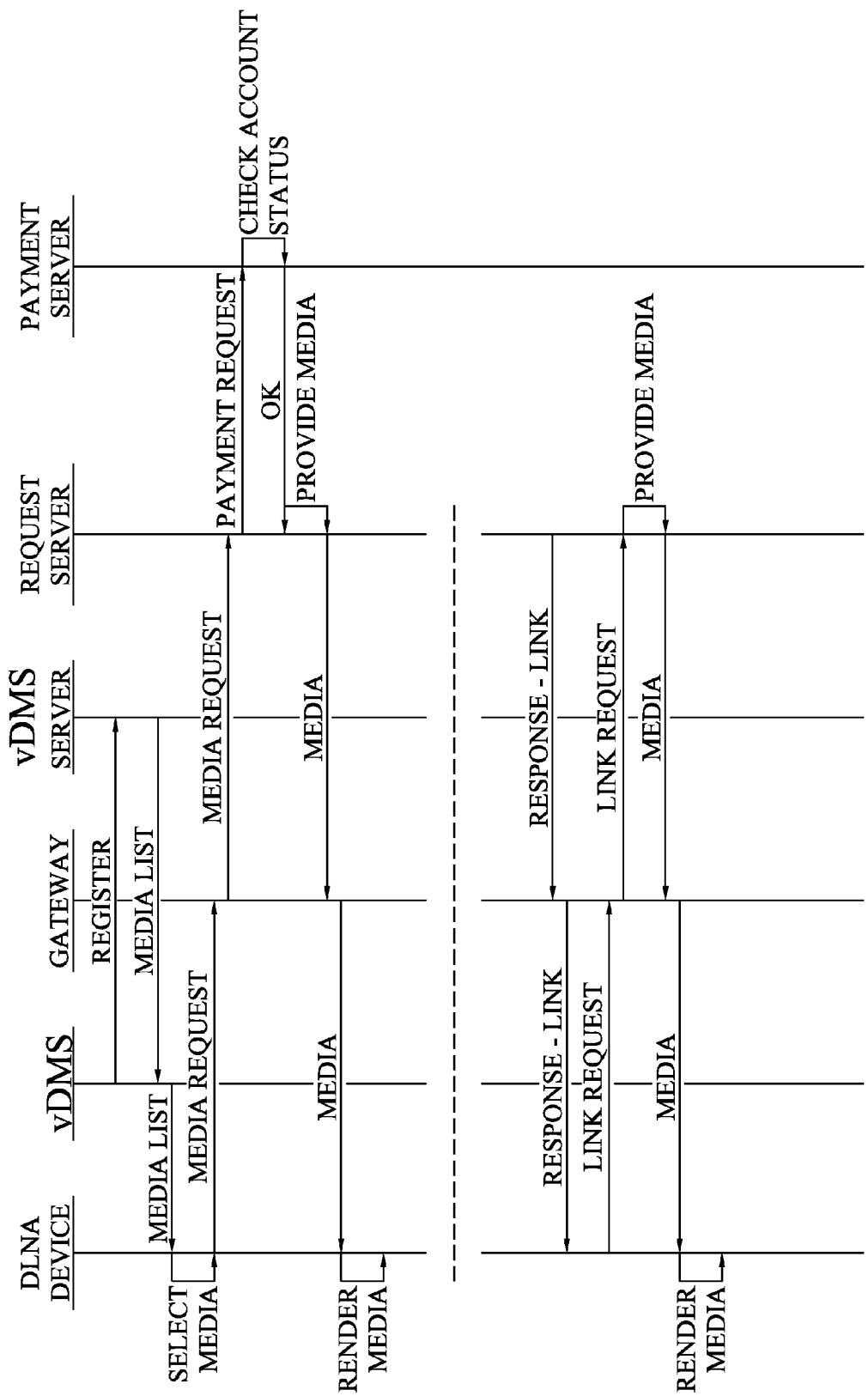
FIG. 5 is a signal diagram of a media distributing method according to an embodiment.

FIG. 5 is an example of signal diagram for the information distribution method if the media request was granted as determined or indicated by the payment server 70. The payment server 70 then charges the users account, credit card or provides information for invoice generation based on the media identifier and the user identifier. The amount to charge for the particular media content is defined based on the media identifier.

The request server 100 receives the payment response indicating allowance of access to the media content for the user. The request server 100 could directly start the delivery of the media content upon reception of the payment response if it is available to the request server 100. This is indicated in the upper part of FIG. 5.

Alternatively, the request server 100 returns a media response comprising a link to the location from which the media can be fetched, such as:

HTTP/1.1 302 Found
Location: http://www.RequestServer.com/Media/MovieX.mpg

In such a case, the DLNA device 30 receives the media response, compiles and transmits a request for the media based on the link or information in the media response and then receives the media data as indicated in the lower portion of FIG. 5.

When comparing the denied media content access in the signal diagram of FIG. 4 and the granted media content access in the signal diagram of FIG. 5, media data is directly returned to the DLNA device 30 by the request server 100 or is fetched by the DLNA device 30 through the request generated based on the link-carrying response from the request server 100 in both figures. However, in FIG. 5, the media data is actually the requested media content, whereas in FIG. 4, the media data is the response information telling, when being rendered, the user of the denied media access. Furthermore, in both cases the media data, i.e. media content or response information, is of the same media type, such as video, audio or image.

Figure 6:
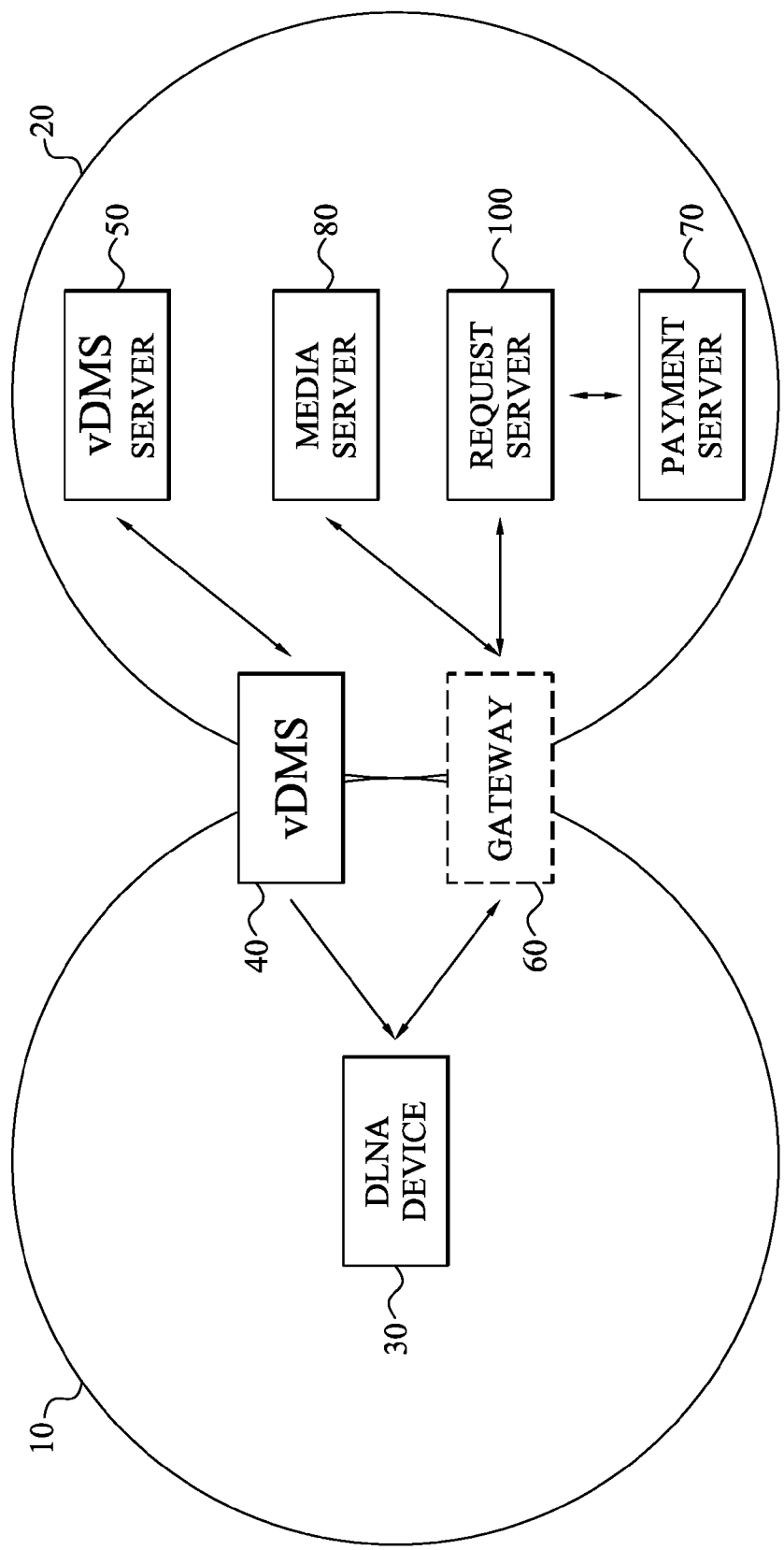
FIG. 6 is a schematic overview a home network and a global network with including units according a further embodiment.

In FIGS. 4 and 5 and when the request server 100 returns a response comprising a link to the media content or response information, the link has been to a location co-housed in the request server 100. FIG. 6 illustrates an alternative approach. In this figure, a dedicated media server 80 is arranged in the global network 20, either in the same network node or another network node as compared to the request server 100. This media server 80 has access to media data and pre-generated response information that is distributed to DLNA-devices 30 upon request.

Figure 7:
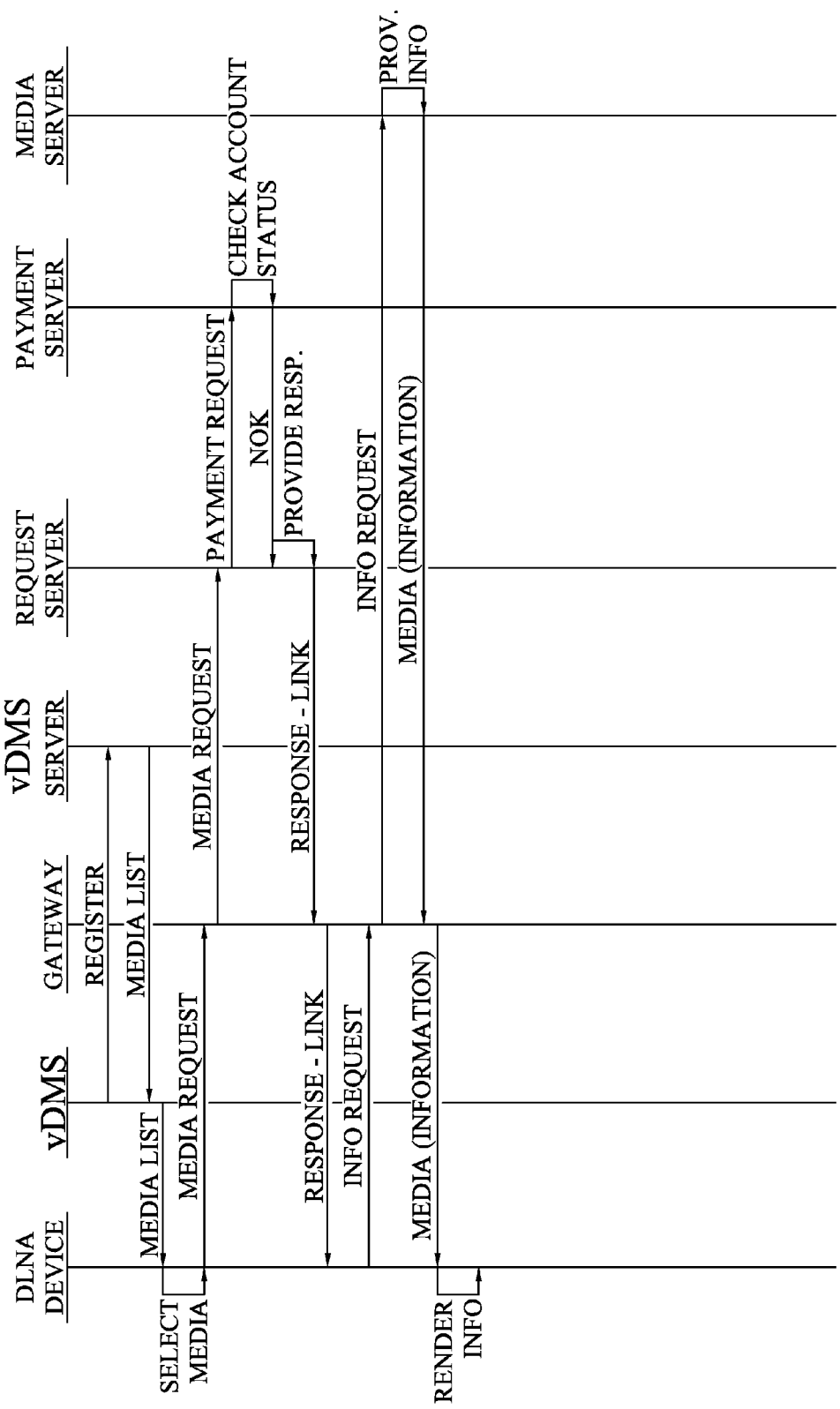
FIG. 7 is a signal diagram of an information distributing method according to a further embodiment.

With reference to FIG. 7, the request server 100 concludes that the DLNA-device 30 should be denied access to the requested media content, for instance as determined based on a payment response from a payment server 70. The request server 100 compiles and transmits a redirect response to the DLNA device 30 optionally through the gateway 60. This redirect response comprises a link or other data allowing the DLNA device 30 to automatically compile and transmit a response information request to the media server 80. The media server 80 returns one or more data packets carrying the response information having the same media type as the originally requested media content. The response information is rendered by a digital media player housed or wired/wirelessly connected to the DLNA device 30 in the home network and informs the user of the denied media content access.

Figure 8:
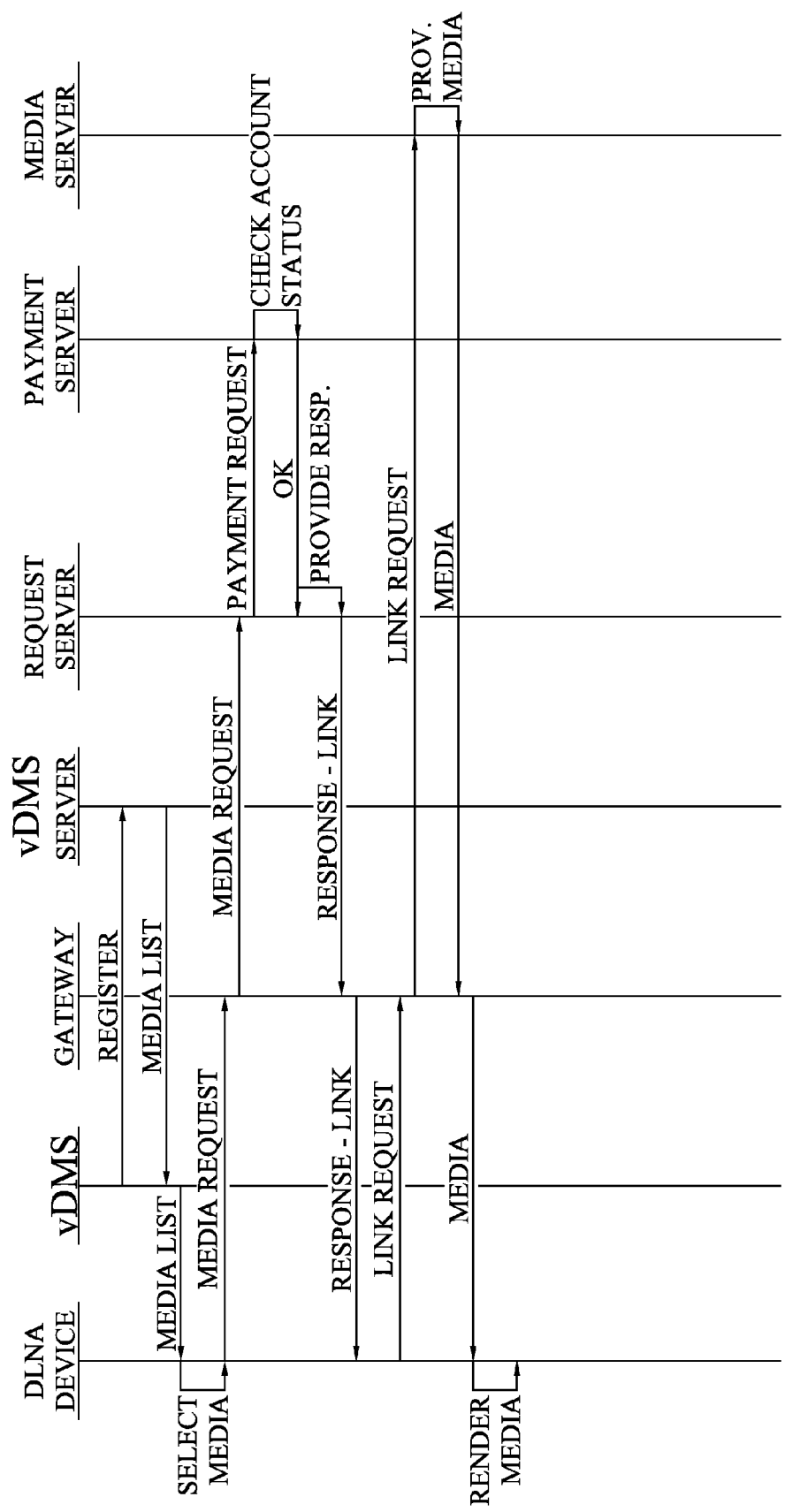
FIG. 8 is a signal diagram of a media distributing method according to another embodiment.

FIG. 8 is the corresponding signal diagram for the case where the request server 100 concludes that the user is granted access to the requested media content. In similarity to FIG. 7, the request server 100 returns a response to the DLNA device 30 carrying the link to the relevant media content in the media server 80. The DLNA device 30 automatically generates and transmits a request for the media content to the media server 80 based on the provided link. The media server 80 returns one or more data packets carrying the requested media content to the DLNA device 30 for rendering by the digital media player.

The example of communication system illustrated in FIG. 6 can be extended to additionally comprise a so-called response server in addition to the media server 80, the request server 100 and the payment server 70. In such a case, the request server 100 returns a response carrying a link to the response server in the case access to the media content is denied for a user. This means that the media server 80 then only has access to and provides media content, whereas pre-defined response information in the different media formats are instead managed by the response server.

As a further example, a dedicated response server can also be present and used in the communication systems illustrated in FIGS. 1 and 3. In such a case, the request server 100 has access to and manages requested media content, whereas the response server provides response information.

A further possibility is that the media server 80 provides media content, whereas the request server 100 manages the response information.

Usage of response information for the purpose of informing a user of any denied media content access, e.g. due to too low account status, should merely be seen as an illustrative example of how the response information can be used. Generally, the embodiments provide feedback to DLNA devices from a back-end system beyond the vDMS on the outcome of its actions by using special media instances, i.e. the response information. The back-end system can therefore choose different media depending on some constrains, such as too low status account, which can give explicit answers to the user through the played media. Thus, an interrogative system can be established in the constrained field of DLNA and UPnP compatible devices.

Further non-limiting examples of response information that can be used in the embodiments, is media data that, when being rendered by the digital media player in the home network, displays or plays back information of an account status of the user at the payment server.

Figure 9:
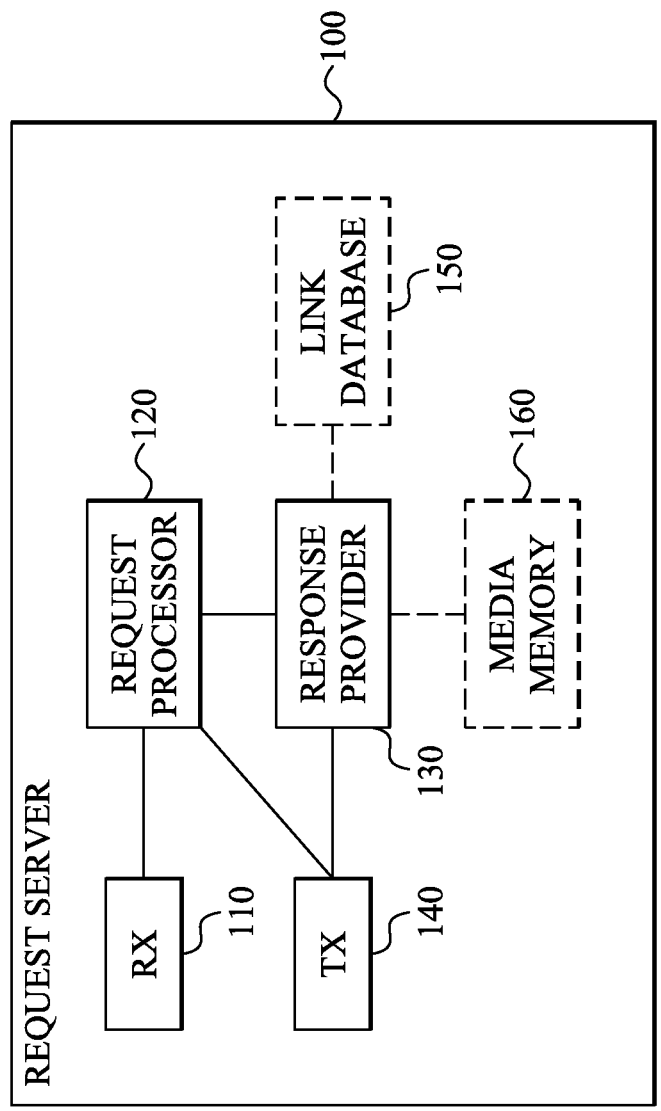
FIG. 9 is a schematic block diagram of a request server according to an embodiment.

FIG. 9 is a schematic block diagram of an embodiment of a request server 100, such as implemented in the communication system of FIG. 1, 3 or 6. The request server 100 comprises a receiver 110 arranged for receiving a media request over a global network and from user equipment present in a home network. As previously described, the requested media content is of a particular media type, such as video, audio or image, and video/audio/image format. Furthermore, the media request comprises a media identifier and a user identifier.

The media request is forwarded to a request processor 120 arranged for processing the media request based on the included media identifier and the user identifier. The request processor 120 in particular detects the media type and preferably media format of the requested media content based on the media identifier included in the received media request.

A connected response provider 130 provides a response based on the processing of the media request by the request processor 120. The response provider 130 typically selects the appropriate media type or format of the response information based on the detected media type or format determined by the request processor 120. The response is then generated based on the selected response information. The response is forwarded to a transmitter 140 that sends it to the requesting user equipment. There the response enables rendering by a digital media player of information relating to the media request and being of the same media type and further preferably the same media format as the originally requested media content.

In a particular embodiment, the receiver 110 receives a HTTP request as media request, comprising the media identifier and the user identifier. In such a case, the response provider 130 could provide a HTTP redirect response based on the processing conducted by the request processor 120. This HTTP redirect response comprises a HTTP link to the response information in a server present in the global network. In this embodiment, the request server 100 preferably has or is connected to a link database 150 comprising the links to the response information in the server. In such a case, the link database 150 preferably comprises, for each particular type of response information, multiple links that are used depending on the media type and format of the requested media content. For instance, if the response information is in the form of a denied media access, this response information could be present in at least three media types, such as video, audio or image type. A further division into the particular video, audio and image formats is also preferred.

In an alternative embodiment of the request server 100, the response provider 130 is connected to a media memory 160 present in or connected to the request server 100. This media memory 160 then houses the pre-defined response information in the different media types and formats. The response provider 130 does then not provide any redirect response but can instead directly compile one or more data packets carrying the response information.

The request processor 120 is arranged, in an embodiment, for generating a payment request based on the media identifier and the user identifier. The payment request is either forwarded directly to a payment server optionally using a general input and output (I/O) interface (not illustrated), if the two servers are implemented in the same network node. Alternatively, the payment request is sent by the transmitter 140 to the remotely arranged payment server. The receiver or I/O interface then receives a payment response from the payment server indicating whether the user is allowed or not allowed access to the media content based on an account status of the user.

The units 110 to 140 of the request server 100 may be implemented in hardware, software or a combination of hardware and software. The units 110 to 160 may all be implemented together in a single network node of the global network. Alternatively, a distributed implementation is also possible with some of the units 110 to 160 arranged in different network nodes but still operating as a request server 100.

Figure 10:
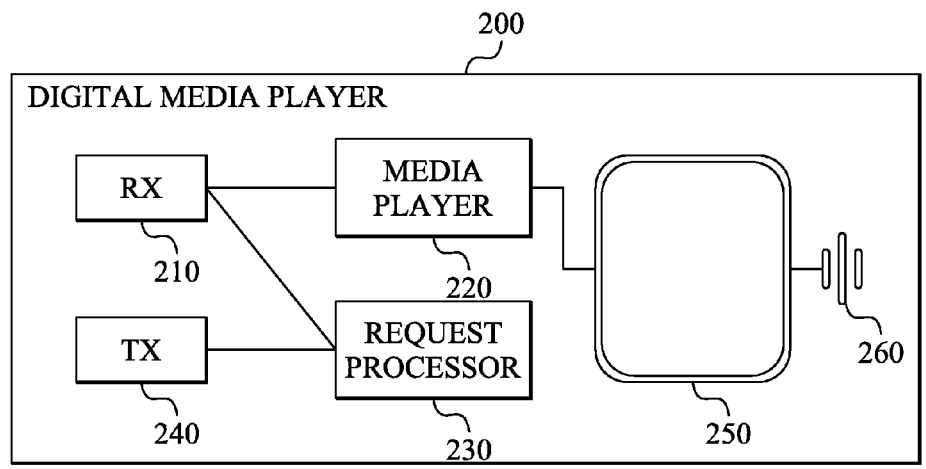
FIG. 10 is a schematic block diagram of an implementation of a digital media player according to an embodiment.

FIG. 10 is a schematic block diagram of DLNA compatible user equipment 200 according to an embodiment. In this figure, the user equipment 200 is in the form of a digital media player (DMP) or a M-DMP 200. The DMP 200 comprises a receiver 210 and transmitter 240 for wirelessly and/or wiredly communicating with other DLNA compatible user equipment present in the home network, including a vDMS unless being arranged in the DMP 200. The receiver 210 and transmitter 240, or a dedicated receiver-transmitter pair, are arranged for conducting communication with a remote request server, possibly through a gateway. In particular, a request processor 230 is provided in the DMP 200 for generating a media request based upon a user selecting a content presented on an attached display screen 250 and listed by a vDMS. The generated media request comprises the media identifier and the user identifier.

In an optional embodiment, the request processor 230 is also arranged for compiling a response information/media request based on a link provided in a redirect response received by the receiver 210.

The DMP 200 also comprises in this embodiment a media player 220 arranged for rendering or playing back media content and data. The media player 220 therefore has access to a display screen 250 and/or loudspeaker 260. Once the receiver 210 receives media data, either the media content or the response information, it forwards the data to the media player 220 for processing and rendering on the display screen 250 and/or loudspeaker 260, depending on the media type of the media content or response information.

The units 210 to 240 of the DMP 200 may be implemented in hardware, software or indeed a combination of hardware and software.

Figure 11:
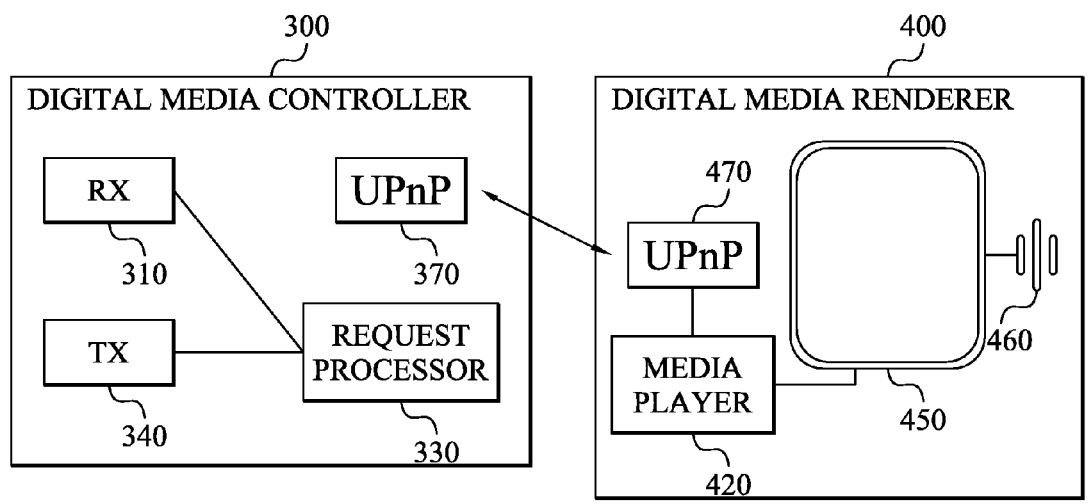
FIG. 11 is a schematic block diagram of an implementation of a digital media player according to another embodiment.

FIG. 11 illustrates another possible set of DLNA compatible user equipment. In this case a digital media controller (DMC) or M-DMC 300 is used by the user for selecting media content from a vDMS, generating a media request with a request processor 330 and remotely transmitting the media request by a transmitter 340. A receiver 310 of the DMC 300 receives the requested media content or response information, which is forwarded using a UPnP-enabled communication unit 370 to a corresponding unit 470 at a digital media renderer 400. The communication unit 470 forwards the media data, i.e. media content or response information, to a media player 420 that renders the data for display on a display screen 450 and/or playback on a loudspeaker 460.

The units 310 to 370 of the DMC 300 and the units 420 and 470 of the DMR 400 may be implemented in hardware, software or indeed a combination of hardware and software.

It will be understood by a person skilled in the art that various modifications and changes may be made to the present invention without departure from the scope thereof, which is defined by the appended claims.

The invention claimed is:

1. An information distributing method executed by a request server arrangeable in a global network connected to a home network wherein the home network includes a user equipment and a digital media player, the method comprising:
    receiving, by the request server over the global network, a media request for a media content having a specific media type and format, the media request originating from the user equipment, said media request comprising a media identifier of said media content and a user identifier of a user of said user equipment;
    processing, by the request server, said media request in a request processor by:
        concluding, based on said media identifier and said user identifier, that said user is not allowed access to said media content; and
        detecting said specific media type and format of said media content based on said media identifier;
    selecting, by the request server, response information;
    generating, by the request server, a response based on the selected response information and based on said detected specific media type and format of the media content, said response also being of said specific media type and format, wherein said response includes a message informing said user of the disallowed access to said media content; and
    transmitting, by the request server, said response over said global network to said user equipment, said response enabling rendering by the digital media player of said message.

2. The method according to claim 1, wherein receiving the media request comprises receiving a hypertext transfer protocol (HTTP) request comprising said media identifier and said user identifier originating from said user equipment.

3. The method according to claim 2, wherein generating said response comprises generating an HTTP redirect response, based on said processing of said request, comprising an HTTP link to said response information in a server present in said global network.

4. The method according to claim 1, wherein generating said response comprises generating at least one data packet comprising said response information of said specific media type and format.

5. The method according to claim 1, wherein processing said media request comprises:
    generating a payment request based on said media identifier and said user identifier;
    transmitting said payment request to a payment server; and
    receiving a payment response from said payment server indicating whether said user is allowed access to said media content based on an account status of said user.

6. The method according to claim 1, wherein said user equipment comprises a digital living network alliance compatible user equipment.

7. A request server arrangeable in a global network connected to a home network, wherein the home network includes a user equipment and a digital media player, said request server comprising:
    a processor; and
    a memory storing computer instructions that when executed by the processor cause the processor to perform operations comprising:
        receiving, over said global network, a media request for a media content having a specific media type and format, the media request originating from said user equipment, said media request comprising a media identifier of said media content and a user identifier of a user of said user equipment;
        processing said media request in a request processor by:
            concluding, based on said media identifier and said user identifier, that said user is not allowed access to said media content; and
            detecting said specific media type and format of said media content based on said media identifier;
        selecting, by the server, response information;
        generating a response based on the selected response information and based on said specific media type and format of the media content, said response also being of said specific media type and format, wherein said response includes a message informing said user of the disallowed access to said media content; and
        transmitting said response over said global network to said user equipment, said response enabling rendering of said message by the digital media player.

8. The request server according to claim 7, wherein said operations further include receiving a hypertext transfer protocol (HTTP) request comprising said media identifier and said user identifier originating from said user equipment.

9. The request server according to claim 8, wherein said operations further include generating an HTTP redirect response, based on said processing of said request by said request processor, comprising an HTTP link to said response information in a server present in said global network.

10. The request server according to claim 7, wherein said operations further include generating at least one data packet comprising said response information of said specific media type and format.

11. The request server according to claim 7, wherein said operations further include:
   generating a payment request based on said media identifier and said user identifier;
   transmitting said payment request to a payment server; and
   receiving a payment response from said payment server indicating whether said user is allowed access to said media content based on an account status of said user.

* * * * *